United States Patent
Tokunaga et al.

(10) Patent No.: US 12,528,731 B2
(45) Date of Patent: *Jan. 20, 2026

(54) ALKALI-FREE GLASS

(71) Applicant: AGC Inc., Tokyo (JP)

(72) Inventors: Hirofumi Tokunaga, Tokyo (JP); Kazutaka Ono, Tokyo (JP); Motoyuki Hirose, Tokyo (JP)

(73) Assignee: AGC Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/663,496

(22) Filed: May 14, 2024

(65) Prior Publication Data

US 2024/0300846 A1 Sep. 12, 2024

Related U.S. Application Data

(63) Continuation of application No. 17/070,035, filed on Oct. 14, 2020, now Pat. No. 12,017,953, which is a continuation of application No. PCT/JP2019/017280, filed on Apr. 23, 2019.

(30) Foreign Application Priority Data

Apr. 27, 2018 (JP) ................. 2018-086580

(51) Int. Cl.
C03C 3/087 (2006.01)
C03B 17/06 (2006.01)
C03C 3/091 (2006.01)
C03C 4/00 (2006.01)

(52) U.S. Cl.
CPC ............ *C03C 3/087* (2013.01); *C03B 17/064* (2013.01); *C03C 3/091* (2013.01); *C03C 4/0085* (2013.01); C03C 2203/10 (2013.01)

(58) Field of Classification Search
CPC ................. C03C 3/087; C03C 3/091
See application file for complete search history.

(56) References Cited

U.S. PATENT DOCUMENTS

| 11,414,339 B2 | 8/2022 | Tokunaga |
| 2005/0065014 A1 | 3/2005 | Narita et al. |
| 2012/0088648 A1 | 4/2012 | Ellison et al. |
| 2016/0039710 A1 | 2/2016 | Tokunaga et al. |
| 2017/0260085 A1 | 9/2017 | Tokunaga et al. |
| 2019/0185368 A1 | 6/2019 | Tokunaga et al. |

FOREIGN PATENT DOCUMENTS

| CN | 102531386 A | 7/2012 |
| JP | 2005-97090 A | 4/2005 |
| JP | 2006-36625 A | 2/2006 |
| JP | 2006-36626 A | 2/2006 |
| WO | WO 2014/175215 A1 | 10/2014 |
| WO | WO 2017/204143 A1 | 11/2017 |
| WO | WO 2018/038059 A1 | 3/2018 |

OTHER PUBLICATIONS

International Search Report issued Aug. 6, 2019 in PCT/JP2019/017280 filed Apr. 23, 2019, 2 pages.

*Primary Examiner* — Elizabeth A. Bolden

(74) *Attorney, Agent, or Firm* — Oblon, McClelland, Maier & Neustadt, L.L.P.

(57) ABSTRACT

An alkali-free glass having a strain point of 650° C. or more, an average coefficient of thermal expansion at 50 to 350° C. of from $30 \times 10^{-7}$ to $45 \times 10^{-7}$/° C., and a temperature $T_2$ at which a glass viscosity reaches $10^2$ dPa·s of from 1,500 to 1,800° C. The alkali-free glass contains, as represented by mol % based on oxides, $SiO_2$: from 62 to 70%, $Al_2O_3$: from 9 to 16% $B_2O_3$: from 0 to 12%, MgO: from 3 to 10%, CaO: from 4 to 12%, SrO: from 0 to 6%, and $Fe_2O_3$: from 0.001 to 0.04%, provided that MgO+CaO+SrO+BaO is from 12 to 25%. The alkali-free glass has a β-OH value of from 0.35 to 0.85/mm.

9 Claims, No Drawings

ALKALI-FREE GLASS

CROSS REFERENCE TO RELATED APPLICATIONS

This application is a continuation application of U.S. patent application Ser. No. 17/070,035, filed on Oct. 14, 2020, which is a continuation of PCT/JP2019/017280, filed on Apr. 23, 2019, and claims priority to JP Patent Application No. 2018-086580, filed on Apr. 27, 2018, the entire contents of which are incorporated herein by reference.

TECHNICAL FIELD

The present invention relates to an alkali-free glass. More specifically, the present invention relates to an ultraviolet transmitting alkali-free glass suitable as a glass substrate or support glass substrate used in a product or production process of various electronic devices.

BACKGROUND ART

In recent years, needs for a glass substrate having a high ultraviolet transmittance are increasing. Examples of such a substrate include a glass substrate in a liquid flat panel display, etc. having a structure in which two glass substrates are stuck together using an ultraviolet-curable resin, and a support glass substrate for the production of an organic light-emitting diode (OLED) (for example, a flexible OLED containing a polyimide layer), etc. produced by the stacking on a support glass substrate. In the latter example, after the production step of OLED, an adhesive layer on a support glass substrate is rendered non-adhesive through ultraviolet irradiation, and the support substrate is separated from OLED. As concerns a device characterized by being lightweight, thin or flexible, such a support glass substrate is useful for ensuring the required strength during the production step.

When these glass substrates contain an alkali metal oxide, alkali metal ions diffuse into a thin film deposited on the substrate and deteriorate the film properties. Accordingly, these glass substrates are required to be an alkali-free glass containing substantially no alkali metal ion.

Patent Literatures 1 to 3 describe an alkali-free glass substrate in which the ultraviolet transmittance in terms of 0.5 mm thickness at the wavelength of 300 nm is from 40 to 85% or from 50 to 85%.

CITATION LIST

Patent Literature

Patent Literature 1: International Publication WO2014/175215
Patent Literature 2: JP-A-2006-36625
Patent Literature 3: JP-A-2006-36626

SUMMARY OF INVENTION

Technical Problem

A mass-produced glass generally contains iron derived from the raw material or the producing step. The iron is present as $Fe^{2+}$ or $Fe^{3+}$ in the glass. Particularly, $Fe^{3+}$ has absorption in the range of wavelength of 300 nm or less and therefore, in order to increase the ultraviolet transmittance of an alkali-free glass (hereinafter, sometimes simply referred to as "glass"), it is conceived to decrease the iron amount in the glass. However, when the iron amount of glass is decreased, the infrared absorption by $Fe^{2+}$ is reduced in the melting step, and the thermal conductivity of glass resultantly increases. Then, at the time of producing a glass by heating a glass base material with heat rays from a burner flame in a furnace, the temperature distribution of the molten glass base material in the furnace is reduced. As a result, it is likely that the convection velocity decreases and the foam quality or homogeneity of the final product deteriorates, because the achievement of refining (removal of bubbles) or homogeneity relies on the presence of sufficient convection.

An object of the present invention is to provide an alkali-free glass allowing for appropriate adjustment of the thermal conductivity while having a high ultraviolet transmittance.

Solution to Problem

The present inventors have found that when the β-OH of glass is increased, the infrared absorption can be increased, i.e., the thermal conductivity can be reduced, while maintaining a low iron amount and a high ultraviolet transmittance. However, if the thermal conductivity is excessively reduced, the molten glass positioned at the bottom of the furnace is not heated enough and rather becomes difficult to flow and rather becomes difficult to flow. Therefore, it is important to keep the thermal conductivity in the optimal range by adjusting the iron amount and β-OH.

The present invention includes the following embodiments.

[1] An alkali-free glass, having a strain point of 650° C. or more, an average coefficient of thermal expansion at 50 to 350° C. of from $30\times10^{-7}$ to $45\times10^{-7}/°$ C., and a temperature $T_2$ at which a glass viscosity reaches $10^2$ dPa·s of from 1,500 to 1,800° C., containing, as represented by mol % based on oxides,
$SiO_2$: from 62 to 70%,
$Al_2O_3$: from 9 to 16%
$B_2O_3$: from 0 to 12%,
MgO: from 3 to 10%,
CaO: from 4 to 12%,
SrO: from 0 to 6%, and
$Fe_2O_3$: from 0.001 to 0.04%
provided that MgO+CaO+SrO+BaO is from 12 to 25% and,
having a β-OH of from 0.35 to 0.85/mm.

[2] The alkali-free glass according to [1], wherein the value represented by the following formula A is from 7 to 30:

$$(3.119\times10^{-4}T_2^2 - 0.2014T_2 - 17.38)[Fe_2O_3] + (6.434\times10^{-7}T_2^2 + 0.0144T_2 - 7.842)[\beta - OH] \quad \text{Formula A}$$

wherein $[Fe_2O_3]$ is a numerical value as represented by mol % of a total iron in terms of $Fe_2O_3$, and [β-OH] is a numerical value represented by a unit/mm:

[3] The alkali-free glass according to [1] or [2], having an effective thermal conductivity at the temperature $T_2$ at which the glass viscosity reaches $10^2$ dPa·s of from 40 to 65 W/m·K.

[4] The alkali-free glass according to any one of [1] to [3], having a transmittance at a wavelength of 300 nm in terms of a plate thickness of 0.5 mm of 50% or more.

[5] The alkali-free glass according to any one of [1] to [4], having a glass plate shape and a thickness of from 0.05 mm to 3 mm.

[6] A method for producing the alkali-free glass according to any one of [1] to [5], including a step of forming a molten glass by a float process or a fusion process.

[7] A display panel having the alkali-free glass according to any one of [1] to [5].

[8] A semiconductor device having the alkali-free glass according to any one of [1] to [5].

[9] An information recording medium having the alkali-free glass according to any one of [1] to [5].

Advantageous Effects of Invention

The alkali-free glass of the present invention has a thermal conductivity adjusted to a desired value while having a high ultraviolet transmittance. Accordingly, the alkali-free glass can be produced with good heating efficiency by use of heating means such as burner flame, and a high-quality alkali-free glass suitable as a glass substrate or support glass substrate for various electronic devices such as thin display and organic EL can be provided.

DESCRIPTION OF EMBODIMENTS

In this embodiment, the "alkali-free" glass means a glass containing substantially no alkali metal oxide such as $Na_2O$ and $K_2O$. The "containing substantially no" means that the component is not added except for those unavoidably contained as impurities. In the present invention, "containing substantially no alkali metal oxide" indicates, for example, that the content of the alkali metal oxide is 0.5% or less, preferably 0.2% or less, more preferably 0.1% or less, still more preferably 0.08% or less, yet still more preferably 0.05% or less, and most preferably 0.03% or less (mol % based on oxides).

The alkali-free glass according to this embodiment contains a predetermined amount of a metal oxide component, in addition to $SiO_2$ and $Al_2O_3$ forming network of glass. The content based on oxides of each component in the alkali-free glass according to this embodiment is described below. In the following, unless otherwise indicated, "%" means "mol %".

The content of $SiO_2$ is from 62 to 70%. The content of $SiO_2$ is preferably 63% or more, more preferably 64% or more, still more preferably 65% or more, yet still more preferably 65.5% or more. In the case where the content of $SiO_2$ is less than the lower limit value, the strain point is low, and there is a tendency that the coefficient of thermal expansion and the specific gravity are increased and the hydrofluoric acid resistance is reduced. Hydrofluoric acid and buffered hydrofluoric acid (BHF: a mixed solution of hydrofluoric acid and ammonium fluoride) are chemicals usually used for etching treatment involved in the semiconductor formation or thinning. On the other hand, the content of $SiO_2$ is preferably 69% or less, more preferably 68.5% or less, still more preferably 68% or less, yet still more preferably 67.5% or less. In the case where the content of $SiO_2$ exceeds the upper limit value, for example, the temperature ($T_2$) at which the glass viscosity reaches $10^2$ poise (dPa·s) rises, and there is a tendency that the meltability decreases and the devitrification temperature increases.

The content of $Al_2O_3$ is from 9 to 16%. The content of $Al_2O_3$ is preferably 10% or more, more preferably 10.5% or more, still more preferably 10.8% or more, yet still more preferably 11% or more. In the case where the content of $Al_2O_3$ is less than the lower limit value, the control of phase separation is difficult, and there is a tendency that the strain point decreases and the coefficient of thermal expansion increases. On the other hand, the content of $Al_2O_3$ is preferably 15% or less, more preferably 14% or less, still more preferably 13.8% or less, yet still more preferably 13.5% or less. In the case where the content of $Al_2O_3$ exceeds the upper limit value, $T_2$ rises, and there is a tendency that the meltability decreases and the devitrification temperature increases.

The content of $B_2O_3$ is from 0 to 12%. $B_2O_3$ is not essential but can be contained, because it provides good melting reactivity to glass at the time of production, decreases devitrification temperature, and improves BHF resistance. The content of $B_2O_3$ is preferably 0.5% or more, more preferably 0.8% or more, still more preferably 1% or more, yet still more preferably 1.2% or more. On the other hand, the content of $B_2O_3$ is preferably 11% or less, more preferably 10% or less, still more preferably 9% or less, yet still more preferably 8.5% or less. In the case where the content of $B_2O_3$ exceeds the upper limit value, the strain point tends to decrease.

The content of MgO is from 3 to 10%. The content of MgO is preferably 4% or more, more preferably 4.5% or more, still more preferably 5% or more, yet still more preferably 5.5% or more. MgO is effective in enhancing the meltability, decreasing the specific gravity and furthermore, increasing the hydrofluoric acid resistance without increasing the coefficient of thermal expansion, compared with other alkaline earths. However, in the case where the content thereof is less than the lower limit value, it is difficult to sufficiently obtain these effects. On the other hand, the content of MgO is preferably 9.7% or less, more preferably 9.5% or less, still more preferably 9.3% or less, yet still more preferably 9.1% or less. In the case where the content of MgO exceeds the upper limit value, the devitrification temperature may increase.

The content of CaO is from 4 to 12%. The content of CaO is preferably 4.2% or more, more preferably 4.5% or more, still more preferably 4.7% or more, yet still more preferably 5% or more. Among alkaline earths, CaO also has a characteristic of, next to MgO, not increasing the coefficient of thermal expansion and not excessively decreasing the stain point and, as with MgO, enhances the meltability. However, in the case where the content thereof is less than the lower limit value, it is difficult to sufficiently obtain these effects. On the other hand, the content of CaO is preferably 11.5% or less, more preferably 11% or less, still more preferably 10.5% or less, yet still more preferably 10% or less. In the case where the content of CaO exceeds the upper limit value, the coefficient of thermal expansion tends to increase. Furthermore, in the case where the content of CaO exceeds the upper limit value, the devitrification temperature may increase.

The content of SrO is from 0 to 6%. SrO can be contained, because it enhances meltability at the time of glass production without increasing the devitrification temperature of glass. The content of SrO is preferably 0.1% or more, more preferably 0.5% or more, still more preferably 1% or more, yet still more preferably 1.2% or more. On the other hand, the content of SrO is preferably 5.8% or less, more preferably 5.5% or less, still more preferably 5.3% or less, yet still more preferably 5.0% or less. In the case where the content of SrO exceeds the upper limit value, there is a tendency that the specific gravity and the coefficient of thermal expansion are increased and the hydrofluoric acid resistance decreases.

BaO is not an essential component but can be contained, because it does not raise the devitrification temperature of glass and enhances the meltability. However, in the case where BaO is contained in a large amount, there is a tendency that the specific gravity increases and the average coefficient of thermal expansion becomes excessively large. Accordingly, the content of BaO is preferably 1% or less, more preferably 0.5% or less, still more preferably 0.1% or less. It is particularly preferable to contain substantially no BaO.

In the alkali-free glass according to this embodiment, the total amount of alkaline earth metal oxides, i.e., MgO+CaO+SrO+BaO (hereinafter, sometimes referred to as "RO"), is from 12 to 25%. RO is preferably 13% or more, more preferably 14% or more, still more preferably 15% or more, yet still more preferably 15.5% or more. In the case where RO is less than the lower limit value, the meltability of glass deteriorates. In addition, in the case where RO is less than the lower limit value, the devitrification temperature may rise. On the other hand, RO is preferably 23% or less, more preferably 21% or less, still more preferably 20.5% or less, yet still more preferably 20% or less. In the case where RO exceeds the upper limit value, there is a tendency that the strain point decreases, the specific gravity increases, the coefficient of thermal expansion becomes high, and the hydrofluoric acid resistance is reduced.

In the alkali-free glass according to this embodiment, the content of iron is from 0.001 to 0.04% in terms of $Fe_2O_3$. The content of $Fe_2O_3$ is preferably 0.002% or more, more preferably 0.003% or more, still more preferably 0.0035% or more, yet still more preferably 0.004% or more. The content of $Fe_2O_3$ is preferably 0.03% or less, more preferably 0.02% or less, still more preferably 0.018% or less, yet still more preferably 0.016% or less.

As described above, the content of $Fe_2O_3$ contributes to reduction in the ultraviolet transmittance and therefore, it is considered that in the glass requiring ultraviolet transmissibility, the content is preferably low. However, in the case where the $Fe_2O_3$ content of glass is reduced, the infrared absorption ability resultantly decreases, and the thermal conductivity increases. In this embodiment, as a result of detailed studies on the balance with the later-described β-OH, the above-described $Fe_2O_3$ content range has been found.

In addition to the components described above, for enhancing the meltability, refining property, formability, etc., the glass according to this embodiment may contain any of $ZrO_2$, ZnO, $SO_3$, F, Cl, and $SnO_2$, individually or in combination, in a total amount of 2% or less, preferably 1% or less, more preferably 0.5% or less.

On the other hand, in order to prevent an occurrence of characteristic deterioration of a thin film such as metal or metal oxide, etc. provided on the glass plate surface, the glass according to this embodiment is preferably substantially free from $P_2O_5$. Furthermore, in order to facilitate the recycling of glass, it is preferable to be substantially free from PbO, $As_2O_3$, and $Sb_2O_3$.

In the alkali-free glass according to this embodiment, the β-OH value as an index of water amount is from 0.35 to 0.85/mm. The β-OH value is preferably 0.40/mm or more, more preferably 0.45/mm or more, still more preferably 0.48/mm or more, yet still more preferably 0.50/mm or more. The β-OH value is preferably 0.8/mm or less, more preferably 0.77/mm or less, still more preferably 0.75/mm or less, yet still more preferably 0.7/mm or less.

When the β-OH value is increased, the thermal conductivity can be reduced without decreasing the ultraviolet transmittance. However, if the thermal conductivity is excessively reduced, the above-described problems may be caused. Using different combinations of the iron amount and the β-OH value, the present inventors have analyzed the degree of contribution of these two factors to the reduction of the thermal conductivity near the melting point and found the above-described β-OH value range that is particularly suitable for the production of a high-ultraviolet-transmitting alkali-free glass.

The β-OH value in the alkali-free glass can be adjusted using the method known to one skilled in the art. For example, the β-OH value can be adjusted to be higher by using a hydroxide as a glass raw material (particularly as an Mg or Ca supply source) or by increasing the water vapor partial pressure or the dewpoint in the melting atmosphere.

In the alkali-free glass according to this embodiment, the strain point is 650° C. or more. In the case where the strain point is less than 650° C., heat shrinkage occurs at the time of heat treatment necessary for the production of an electronic device, which may cause a reduction in the yield. The strain point is preferably 655° C. or more, more preferably 660° C. or more, still more preferably 663° C. or more, yet still more preferably 665° C. or more. In the case where the strain point is too high, the temperature of the forming apparatus needs to be increased accordingly, and the life of the forming apparatus tends to be shortened. Therefore, the strain point is preferably 770° C. or less, more preferably 750° C. or less, still more preferably 740° C. or less, yet still more preferably 730° C. or less.

In the alkali-free glass according to this embodiment, the average coefficient of thermal expansion at 50 to 350° C. is from $30\times10^{-7}$/° C. to $45\times10^{-7}$/° C. The average coefficient of thermal expansion at 50 to 350° C. is preferably $33\times10^{-7}$/° C. or more, more preferably $35\times10^{-7}$/° C. or more, still more preferably $36\times10^{-7}$/° C. or more, yet still more preferably $37\times10^{-7}$/° C. or more. For example, in the production of a TFT-side substrate of a flat panel display, a gate metal film such as copper and a gate insulating film such as silicon nitride are sometimes sequentially stacked on an alkali-free glass. In the case where the coefficient of thermal expansion is less than the lower limit value, the difference in the coefficient of expansion between the gate insulating film and the glass is too small, as a result, the effect of the gate insulating film to cancel the glass warpage generated by the deposition of the gate metal film is reduced. Consequently, the warpage of the substrate is increased, giving rise to a problem, for example, that a trouble occurs in terms of transportation or the pattern misregistration during exposure increases. On the other hand, the average coefficient of thermal expansion at 50 to 350° C. is preferably $43\times10^{-7}$/° C. or less, more preferably $42\times10^{-7}$/° C. or less, still more preferably $40\times10^{-7}$/° C. or less, yet still more preferably $39\times10^{-7}$/° C. or less. The glass where the average coefficient of thermal expansion is not more than the upper limit value is resistant to thermal shock and can achieve a high yield.

In the alkali-free glass according to this embodiment, the temperature $T_2$ at which the viscosity reaches $10^2$ poise (dPa·s) is from 1,500 to 1,800° C. $T_2$ is preferably 1,550° C. or more, more preferably 1,570° C. or more, still more preferably 1,580° C. or more, yet still more preferably 1,600° C. or more. In the case where $T_2$ is less than the lower limit value, the melting temperature and refining temperature of the glass deviate from one another, and the refining property of glass may be deteriorated. In addition, in the case where $T_2$ is less than the lower limit value, erosion of the melting furnace by a melt caused to have a low viscosity is likely to proceed, and the life of the production apparatus may be shortened. On the other hand, $T_2$ is preferably 1,750° C. or less, more preferably 1,730° C. or less, still more preferably 1,700° C. or less, yet still more preferably 1,660° C. or less. In the case where $T_2$ exceeds the upper limit value, the meltability of glass is poor and since a high temperature is required, the burden on the production apparatus increases.

In the alkali-free glass according to this embodiment, the temperature $T_4$ at which the viscosity reaches $10^4$ poise (dPa·s) is preferably 1,400° C. or less, more preferably 1,370° C. or less, still more preferably 1,350° C. or less, yet still more preferably 1,320° C. or less. The glass having this $T_4$ is suitable for the forming by a float process. In the case where $T_4$ is high, the life of a casing structure or heater of the float bath may be extremely shortened.

In the alkali-free glass according to this embodiment, the effective thermal conductivity at a temperature $T_2$ at which the glass viscosity reaches $10^2$ dPa·s is from 40 to 65 W/m·K. The effective thermal conductivity at $T_2$ is more preferably 45 W/m·K or more, still more preferably 50 W/m·K or more, yet still more preferably 55 W/m·K or more. The effective thermal conductivity at $T_2$ is more preferably 63 W/m·K or less, still more preferably 60 W/m·K or less, yet still more preferably 57 W/m·K or less.

The effective thermal conductivity is a thermal conductivity measured by a stationary method (J. Am. Cer. Soc. 44, 1961, pp. 333-339) and is sometimes referred to as "apparent thermal conductivity". By virtue of having the above-described effective thermal conductivity at the temperature $T_2$, an optimal convection velocity is generated at the time of melting the glass by heating and in turn, a glass product excellent in the foam quality and homogeneity can be provided.

In the alkali-free glass according to this embodiment, the value represented by formula A is preferably from 7 to 30.

$$(3.119 \times 10^{-4} T_2^2 - 0.2014 T_2 - 17.38)[Fe_2O_3] + \qquad \text{Formula A}$$
$$(6.434 \times 10^{-7} T_2^2 + 0.0144 T_2 - 7.842)[\beta - OH]$$

In the Formula A, $[Fe_2O_3]$ is a numerical value as represented by mol % of the total iron in terms of $Fe_2O_3$, and $[\beta\text{-OH}]$ is a numerical value represented by the unit/mm.

Formula A is led by detailed analysis about to what degree the $Fe_2O_3$ amount and the $\beta$-OH contribute to the reduction of the thermal conductivity at different temperatures.

The value represented by formula A is an index indicating how much the thermal conductivity is reduced, compared with the case where the alkali-free glass contains neither water nor iron. The larger the value of formula A, the larger the range of reduction. The value of formula A is more preferably 10 or more, still more preferably 12 or more, yet still more preferably 14 or more. The value of formula A is more preferably 25 or less, still more preferably 20 or less, yet still more preferably 17 or less.

In the alkali-free glass according to this embodiment, the transmittance in terms of 0.5 mm thickness at the wavelength of 300 nm is 50% or more. Within this range, an ultraviolet transmittance suitable as a substrate or support substrate for various electronic devices is ensured. The transmittance above is more preferably 60% or more, still more preferably 70% or more, yet still more preferably 80% or more.

The alkali-free glass according to this embodiment preferably has a glass plate shape. The thickness of the glass plate is preferably 3 mm or less, more preferably 2 mm or less, still more preferably 1.5 mm or less, yet still more preferably 1.2 mm or less, even yet still more preferably 0.8 mm or less. The thickness of the glass plate is preferably 0.05 mm or more, more preferably 0.1 mm or more, still more preferably 0.15 mm or more, yet still more preferably 0.2 mm or more, even yet still more preferably 0.3 mm or more.

The alkali-free glass according to this embodiment can be produced by appropriately combining techniques known to one skilled in the art. For example, raw materials of respective components described above are blended to afford the above-described predetermined composition, and the mixture is continuously charged into a melting furnace and melted by heating at 1,500 to 1,800° C. to obtain a molten glass. The resulting molten glass is formed into a glass ribbon having a predetermined thickness in a forming apparatus, and the glass ribbon is slowly cooled and then cut.

The production methods for the glass and glass plate of this embodiment are not particularly limited, and various methods can be applied. For example, raw materials of respective components are mixed to afford the target composition, and the mixture is melted by heating in a glass melting furnace. The obtained glass is homogenized, for example, by bubbling, stirring, or addition of a refining agent and then formed into a glass plate having a predetermined thickness by a process such as float process, pressing method, fusion process and down-draw process. The glass plate is slowly cooled and after applying, if desired, a processing such as grinding and polishing, may be used as a glass substrate having a predetermined dimension and shape. When a fusion process is used, the average cooling rate near the glass transition temperature is increased and at the time of further thinning the obtained glass plate by a hydrofluoric acid etching, the surface roughness of the glass plate on the etching-side surface is more reduced.

From the viewpoint of stably producing a large size sheet glass (for example, one side is 1,800 mm or more), it is preferable to use a float process.

The large size substrate is, for example, a glass plate with at least one side being 1,800 mm or more, and specific suitable examples thereof include a glass plate having a long side of 1,800 mm or more and a short side of 1,500 mm or more. The alkali-free glass of this embodiment is used more preferably for a glass plate with at least one side being 2,400 mm or more, for example, a glass plate having a long side of 2,400 mm or more and a short side of 2,100 mm or more, still more preferably for a glass plate with at least one side being 3,000 mm or more, for example, a glass plate having a long side of 3,000 mm or more and a short side of 2,800 mm or more, yet still more preferably for a glass plate with at least one side being 3,200 mm or more, for example, a glass plate having a long side of 3,200 mm or more and a short side of 2,900 mm or more, and most preferably for a glass plate with at least one side being 3,300 mm or more, for example, a glass plate having a long side of 3,300 mm or more and a short side of 2,950 mm or more.

Next, a display panel according to one embodiment of the present invention is described.

The display panel of this embodiment has the alkali-free glass of the above-described embodiment as a glass substrate. As long as it has the alkali-free glass of the above-described embodiment, the display panel is not particularly limited and may be various display panels such as liquid crystal display panel and organic EL display panel.

For example, a thin film transistor-liquid crystal display (TFT-LCD) has a display electrode substrate (array substrate) in which a gate electrode wire and an oxide layer for gate insulation are formed on its surface and a pixel electrode is further formed on a surface of the oxide layer, and a color filter substrate in which an RGB color filter and a counter electrode are formed on its surface, and a liquid crystal material is sandwiched between the paired array and color filter substrates, thereby constructing a cell. The liquid crystal display panel includes other elements such as peripheral circuit, etc., in addition to the cell. In the liquid crystal display panel of this embodiment, the alkali-free glass of the above-described embodiment is used for at least one of the paired substrates constituting the cell.

Next, the semiconductor device according to one embodiment of the present invention has the alkali-free glass of the above-described embodiment as a glass substrate. Specifically, the semiconductor device has the alkali-free glass of the above-described embodiment as a glass substrate for an image sensor such as MEMS, CMOS, CIS, etc. In addition, the semiconductor device has the alkali-free glass of the above-described embodiment as a cover glass for a projection-use display device, for example, as a cover glass of LCOS (Liquid Crystal ON Silicon).

Next, the information recording medium according to one embodiment of the present invention has the alkali-free glass of the above-described embodiment as a glass substrate. Specifically, the information recording medium has the alkali-free glass of the above-described embodiment as a glass substrate for a magnetic recording medium or an optical disc. The magnetic recording medium includes, for example, an energy-assisted magnetic recording medium and a magnetic recording medium using a perpendicular magnetic recording system.

EXAMPLES

The embodiments of the present invention are described in greater detail below by referring to Examples and Comparative Examples, but the present invention is not limited to these Examples.

Raw materials of respective components described above were blended so that the glass composition can be the target composition (unit: mol %) shown in Tables 1 and 2, and melted in a platinum crucible at a temperature of 1,650° C. for 6 hours while stirring with a stirrer. After the melting, the melt was cast on a carbon plate, kept at glass transition temperature+30° C. for 60 minutes, and then cooled to room temperature at a rate of 1° C./min, and the obtained alkali-free glass was mirror-polished to form a glass plate and then subjected to various evaluations. Examples 1 to 4 and 7 to 10 are Working Examples of the present invention, and Examples 5, 6, 11 and 12 are Comparative Examples.

Using an X-ray fluorescent apparatus (XRF) (ZSX100e manufactured by Rigaku Corporation), quantitative analysis was performed by measuring the X-ray intensity of each component on the surface of the glass obtained above, and the composition was confirmed.

The average coefficient of thermal expansion at 50 to 350° C. (unit: ×10⁻⁷/° C.) was measured using a differential dilatometer (TMA) in accordance with the method specified in JIS R3102 (1995). The strain point (unit: ° C.) was measured by the fiber elongation method in accordance with the method specified in JIS R3103-2 (2001). $T_2$ and $T_4$ were measured by means of a rotational viscometer. As for the thermal conductivity, the effective thermal conductivity (hereinafter, sometimes referred to as Keff) of glass was measured in accordance with the stationary method (J. Am. Cer. Soc. 44, 1961, pp. 333-339).

The effective thermal conductivity (Keff) at the temperature $T_2$ was evaluated after the glass of each Example was melted at the temperature $T_2$ in a crucible for effective thermal conductivity measurement to form a glass melt.

The effective thermal conductivity (Keff) was obtained using formula B by measuring each of the thermal conductivity of a crucible containing the glass melt, denoted $K_r$, the thickness of the bottom of the crucible, denoted $d_r$, the depth of the glass melt in the crucible, denoted $d_g$, the temperature on the glass melt surface, denoted $T_s$, the crucible inner bottom temperature at the interface between the glass melt and the crucible inner bottom, denoted $T_b$, and the crucible outer bottom temperature at the crucible outer bottom, denoted $T_r$.

$$K_{\mathit{eff}} = K_r \{(T_b - T_r)/(T_s - T_b)\}(d_g/d_r) \qquad \text{Formula B}$$

The thermal conductivity $K_r$ of the crucible was determined using formula B and using glasses 1 and 2 having a known effective thermal conductivity, shown in Table 3, by measuring each of the thickness $d_r$ of the bottom of the crucible, the depth $d_g$ of the glass melt, the temperature $T_s$ of the glass melt surface, the interfacial temperature $T_b$ between the glass melt and the crucible inner bottom, and the temperature $T_r$ at the crucible outer bottom.

The ultraviolet transmittance was measured by means of Hitachi Spectrophotometer U-4100 in accordance with ISO-9050:2003. The transmittance in terms of the plate thickness of 0.5 mm was determined at a wavelength of 300 nm.

The β-OH value was determined by performing transmittance measurement in the wave number range of 4,000 to 2,000 cm⁻¹ by means of FT-IR after both surfaces of the glass sample were mirror-polished to give a plate thickness of 0.70 to 2.0 mm. Denoting $\tau_1$ [%] as the transmittance at a wave number of 4,000 cm⁻¹, $\tau_2$ [%] as the minimum value of the transmittance near a wave number of 3,600 cm⁻¹, and X [mm] as the plate thickness of glass, the β-OH value was determined according to the following formula. The plate thickness of the glass sample was adjusted such that $\tau_2$ fell in the range of 20 to 60%.

$$\beta - \mathrm{OH}[\mathrm{mm}^{-1}] = (1/X)\log_{10}(\tau_1/\tau_2)$$

TABLE 1

|  | Ex. 1 | Ex. 2 | Ex. 3 | Ex. 4 | Ex. 5 | Ex. 6 |
|---|---|---|---|---|---|---|
| SiO$_2$ | 67.1 | 67.1 | 67.1 | 67.1 | 67.1 | 67.1 |
| Al$_2$O$_3$ | 12.7 | 12.7 | 12.7 | 12.7 | 12.7 | 12.7 |
| B$_2$O$_3$ | 1.3 | 1.3 | 1.3 | 1.3 | 1.3 | 1.3 |
| MgO | 9.1 | 9.1 | 9.1 | 9.1 | 9.1 | 9.1 |
| CaO | 5.4 | 5.4 | 5.4 | 5.4 | 5.4 | 5.4 |

TABLE 1-continued

|  | Ex. 1 | Ex. 2 | Ex. 3 | Ex. 4 | Ex. 5 | Ex. 6 |
| --- | --- | --- | --- | --- | --- | --- |
| SrO | 4.4 | 4.4 | 4.4 | 4.4 | 4.4 | 4.4 |
| BaO | 0.0 | 0.0 | 0.0 | 0.0 | 0.0 | 0.0 |
| $Fe_2O_3$ | 0.004 | 0.008 | 0.012 | 0.016 | 0.050 | 0.004 |
| β-OH [/mm] | 0.70 | 0.60 | 0.50 | 0.40 | 0.60 | 0.10 |
| MgO + CaO + SrO + BaO | 18.9 | 18.9 | 18.9 | 18.9 | 18.9 | 18.9 |
| Average coefficient of thermal expansion [×$10^{-7}$/° C.] | 39 | 39 | 39 | 39 | 39 | 39 |
| Strain point [° C.] | 720 | 720 | 720 | 720 | 720 | 720 |
| $T_2$ [° C.] | 1654 | 1654 | 1654 | 1654 | 1654 | 1654 |
| $T_4$ [° C.] | 1304 | 1304 | 1304 | 1304 | 1304 | 1304 |
| Effective thermal conductivity at $T_2$ [W/m · K] | 57 | 56 | 56 | 56 | 37 | 67 |
| $(3.119 \times 10^{-4}T_2^2 - 0.2014T_2 - 17.38)[Fe_2O_3] + (6.434 \times 10^{-7}T_2^2 + 0.0144T_2 - 7.842)[\beta\text{-OH}]$ | 14.4 | 14.7 | 14.9 | 15.1 | 35.8 | 3.8 |
| Transmittance at 300 nm (in terms of plate thickness of 0.5 mm) [%] | 80 | 69 | 60 | 51 | 8 | 80 |

TABLE 2

|  | Ex. 7 | Ex. 8 | Ex. 9 | Ex. 10 | Ex. 11 | Ex. 12 |
| --- | --- | --- | --- | --- | --- | --- |
| $SiO_2$ | 65.7 | 65.7 | 65.7 | 65.7 | 65.7 | 65.7 |
| $Al_2O_3$ | 11.0 | 11.0 | 11.0 | 11.0 | 11.0 | 11.0 |
| $B_2O_3$ | 7.7 | 7.7 | 7.7 | 7.7 | 7.7 | 7.7 |
| MgO | 5.6 | 5.6 | 5.6 | 5.6 | 5.6 | 5.6 |
| CaO | 5.0 | 5.0 | 5.0 | 5.0 | 5.0 | 5.0 |
| SrO | 5.0 | 5.0 | 5.0 | 5.0 | 5.0 | 5.0 |
| BaO | 0.0 | 0.0 | 0.0 | 0.0 | 0.0 | 0.0 |
| $Fe_2O_3$ | 0.004 | 0.008 | 0.012 | 0.016 | 0.050 | 0.004 |
| β-OH [/mm] | 0.70 | 0.60 | 0.50 | 0.40 | 0.60 | 0.10 |
| MgO + CaO + SrO + BaO | 15.6 | 15.6 | 15.6 | 15.6 | 15.6 | 15.6 |
| Average coefficient of thermal expansion [×$10^{-7}$/° C.] | 38 | 38 | 38 | 38 | 38 | 38 |
| Strain point [° C.] | 665 | 665 | 665 | 665 | 665 | 665 |
| $T_2$ [° C.] | 1645 | 1645 | 1645 | 1645 | 1645 | 1645 |
| $T_4$ [° C.] | 1275 | 1275 | 1275 | 1275 | 1275 | 1275 |
| Effective thermal conductivity at $T_2$ [W/m · K] | 57 | 56 | 56 | 56 | 37 | 67 |
| $(3.119 \times 10^{-4}T_2^2 - 0.2014T_2 - 17.38)[Fe_2O_3] + (6.434 \times 10^{-7}T_2^2 + 0.0144T_2 - 7.842)[\beta\text{-OH}]$ | 14.3 | 14.5 | 14.7 | 15.0 | 35.3 | 3.7 |
| Transmittance at 300 nm (in terms of plate thickness of 0.5 mm) [%] | 80 | 69 | 60 | 51 | 8 | 80 |

TABLE 3

|  | Glass 1 | Glass 2 |
| --- | --- | --- |
| $SiO_2$ | 71.3 | 69.3 |
| $Al_2O_3$ | 1.0 | 1.1 |
| CaO | 9.1 | 9.0 |
| MgO | 5.7 | 6.9 |
| $Na_2O$ | 12.5 | 12.8 |
| $K_2O$ | 0.3 | 0.5 |
| $TiO_2$ | 0.022 | 0.015 |
| $Fe_2O_3$ | 0.031 | 0.449 |
| Co | 0 | 0.0233 |
| Se | 0 | 0.0023 |
| Cr | 0 | 0.0040 |
| Effective thermal conductivity (1600° C.) [W/m · K] | 119.0 | 19.7 |
| Effective thermal conductivity (1500° C.) [W/m · K] | 87.4 | 17.4 |
| Effective thermal conductivity (1400° C.) [W/m · K] | 62.8 | 15.2 |
| Effective thermal conductivity (1300° C.) [W/m · K] | 45.2 | 12.9 |
| Effective thermal conductivity (1200° C.) [W/m · K] | 34.5 | 10.7 |
| Effective thermal conductivity (1100° C.) [W/m · K] | 30.7 | 8.4 |

As shown in Tables 1 and 2, in the glasses of Examples 1 to 4 and 7 to 10, the contents of respective components, particularly, $Fe_2O_3$, and the β-OH value are within specified ranges, and an appropriately low thermal conductivity is ensured while maintaining a high ultraviolet transmittance. Accordingly, these can be produced as an alkali-free glass excellent in the foam quality and homogeneity. Physical properties suitable as a substrate or support substrate for various electronic devices are also ensured.

On the other hand, in the glasses of Examples 5 and 11 where the content of $Fe_2O_3$ is large, the thermal conductivity is reduced, and the required ultraviolet transmittance is not ensured. In Examples 6 and 12, a high ultraviolet transmittance is achieved due to the low iron amount, but the thermal conductivity is also excessively high. In the glasses of Examples 6 and 12, the thermal conductivity is high, and the foam quality and homogeneity of the final product are poor. It is understood that the defects of the glasses of Examples 6 and 12 are compensated for by the β-OH value in the glasses of Examples 1 to 4 and 7 to 10.

While the invention has been described in detail and with reference to specific embodiments thereof, it will be apparent to one skilled in the art that various changes and modifications can be made therein without departing from the spirit and scope of the invention.

This application is based on Japanese Patent Application No. 2018-086580 filed on Apr. 27, 2018, the contents of which are incorporated herein by way of reference.

INDUSTRIAL APPLICABILITY

The alkali-free glass according to an embodiment of the present invention can be used for various applications including electronic devices at large and, among others, can be suitably used for applications requiring a high ultraviolet transmittance, such as glass substrate or support glass substrate for thin display devices or organic EL devices.

The invention claimed is:

1. An alkali-free glass having a strain point of 650° C. or more, an average coefficient of thermal expansion at 50 to 350° C. of from $30 \times 10^{-7}$ to $45 \times 10^{-7}$/° C., and a temperature $T_2$ at which a glass viscosity reaches $10^2$ dPa·s of from 1,500 to 1,800° C., comprising, as represented by mol % based on oxides, SiO$_2$: from 62 to 70%,
Al$_2$O$_3$: from 9 to 16%
B$_2$O$_3$: from 0.5 to 12%,
MgO: from 5.6 to 10%,
CaO: from 4 to 10%,
SrO: from 0.1 to 6%, and
Fe$_2$O$_3$: from 0.001 to 0.04%,
provided that MgO+CaO+SrO+BaO is from 15.6 to 20.5%,
wherein a value represented by the following formula A is from 10 to 20:

$$(3.119 \times 10^{-4} T_2^2 - 0.2014 T_2 - 17.38)[Fe_2O_3] + (6.434 \times 10^{-7} T_2^2 + 0.0144 T_2 - 7.842)[\beta - OH],\quad \text{Formula A}$$

wherein [Fe$_2$O$_3$] is a numerical value represented by mol % of a total iron in terms of Fe$_2$O$_3$, and
[β-OH] is a numerical value represented by a unit/mm.

2. The alkali-free glass according to claim 1, having a β-OH value of from 0.35 to 0.85/mm.

3. The alkali-free glass according to claim 1, having an effective thermal conductivity at the temperature $T_2$ at which the glass viscosity reaches $10^2$ dPa·s of from 40 to 65 W/m·K.

4. The alkali-free glass according to claim 1, having a transmittance at a wavelength of 300 nm in terms of a plate thickness of 0.5 mm of 50% or more.

5. The alkali-free glass according to claim 1, having a glass plate shape and a thickness of from 0.05 mm to 3 mm.

6. A method for producing the alkali-free glass according to claim 1, comprising:
forming a molten glass by a float process or a fusion process.

7. A display panel, comprising:
the alkali-free glass according to claim 1.

8. A semiconductor device, comprising:
the alkali-free glass according to claim 1.

9. An information recording medium, comprising:
the alkali-free glass according to claim 1.

* * * * *